United States Patent [19]

Florian et al.

[11] Patent Number: 4,819,128
[45] Date of Patent: Apr. 4, 1989

[54] ELECTRICAL MULTILAYER COMPONENT COMPRISING A SINTERED, MONOLITHIC CERAMIC BODY AND METHOD FOR ITS MANUFACTURE

[75] Inventors: Heinz Florian, Deutschlandsberg; Josef Unterlass, Graz; Franz Zettl; Johann Ramler, both of Deutschlandsberg; Gerhard Kelz; Anna Moshammer, both of Graz, all of Austria

[73] Assignee: Siemens Aktiengesellschaft, Berlin and Munich, Fed. Rep. of Germany

[21] Appl. No.: 210,766

[22] Filed: Jun. 23, 1988

[30] Foreign Application Priority Data

Jul. 31, 1987 [DE] Fed. Rep. of Germany ....... 3725454

[51] Int. Cl.[4] .......................... H01G 3/06; H01C 7/00
[52] U.S. Cl. ...................................... 361/321; 338/21
[58] Field of Search ............... 361/321, 328, 330, 320; 29/25.42, 621, 613; 252/512; 338/21

[56] References Cited

U.S. PATENT DOCUMENTS

| | | | |
|---|---|---|---|
| 3,394,386 | 7/1968 | Weller et al. | 361/321 X |
| 3,679,950 | 7/1972 | Rutt | 361/321 |
| 3,683,849 | 8/1972 | Atchley et al. | 118/50 |
| 3,740,624 | 6/1973 | McAdams et al. | 361/321 X |
| 3,879,645 | 4/1975 | Rutt et al. | 361/321 |
| 4,071,880 | 1/1978 | Rutt | 361/309 |
| 4,526,129 | 7/1985 | Braden | 118/503 |
| 4,561,954 | 12/1985 | Scrantom et al. | 29/25.42 X |
| 4,584,629 | 4/1986 | Garcia et al. | 361/321 |
| 4,604,676 | 8/1986 | Senda et al. | 361/321 |
| 4,658,328 | 4/1987 | Sakabe | 361/309 |
| 4,660,017 | 4/1987 | Momoki et al. | 338/21 |
| 4,675,644 | 6/1987 | Otto et al. | 338/21 |

FOREIGN PATENT DOCUMENTS

| | | |
|---|---|---|
| 0189087 | 1/1986 | European Pat. Off. . |
| 2722140 | 6/1979 | Fed. Rep. of Germany . |
| 3509593 | 3/1985 | Fed. Rep. of Germany . |
| 3627936 | 8/1986 | Fed. Rep. of Germany . |
| 3627929 | 8/1986 | Fed. Rep. of Germany . |
| 3612084 | 10/1986 | Fed. Rep. of Germany . |
| 3638286 | 11/1986 | Fed. Rep. of Germany . |
| 932558 | 7/1963 | United Kingdom . |
| 2106714 | 5/1982 | United Kingdom . |
| 2162371 | 1/1986 | United Kingdom . |

*Primary Examiner*—Donald A. Griffin
*Attorney, Agent, or Firm*—Hill, Van Santen, Steadman & Simpson

[57] ABSTRACT

A sintered monolithic ceramic body or an electrical multilayer component includes cavities that are alternately open toward opposite end faces and are open to a slight portion of the lateral surfaces which are at right angles to the end faces. The cavities contain ceramic particles which act as supporting elements and are completely filled with a filler metal whose melting temperature is considerably lower than the sintering temperature of the ceramic body, the metal being capable of wetting the surfaces of the ceramic layers in the cavities in its molten state. The edges between the six outside surfaces of the component are rounded off as by abrasion so that the metal fillings extend up to contact elements which are applied after the metal is introduced.

14 Claims, 3 Drawing Sheets layer of electrically insulating and moisture proof material

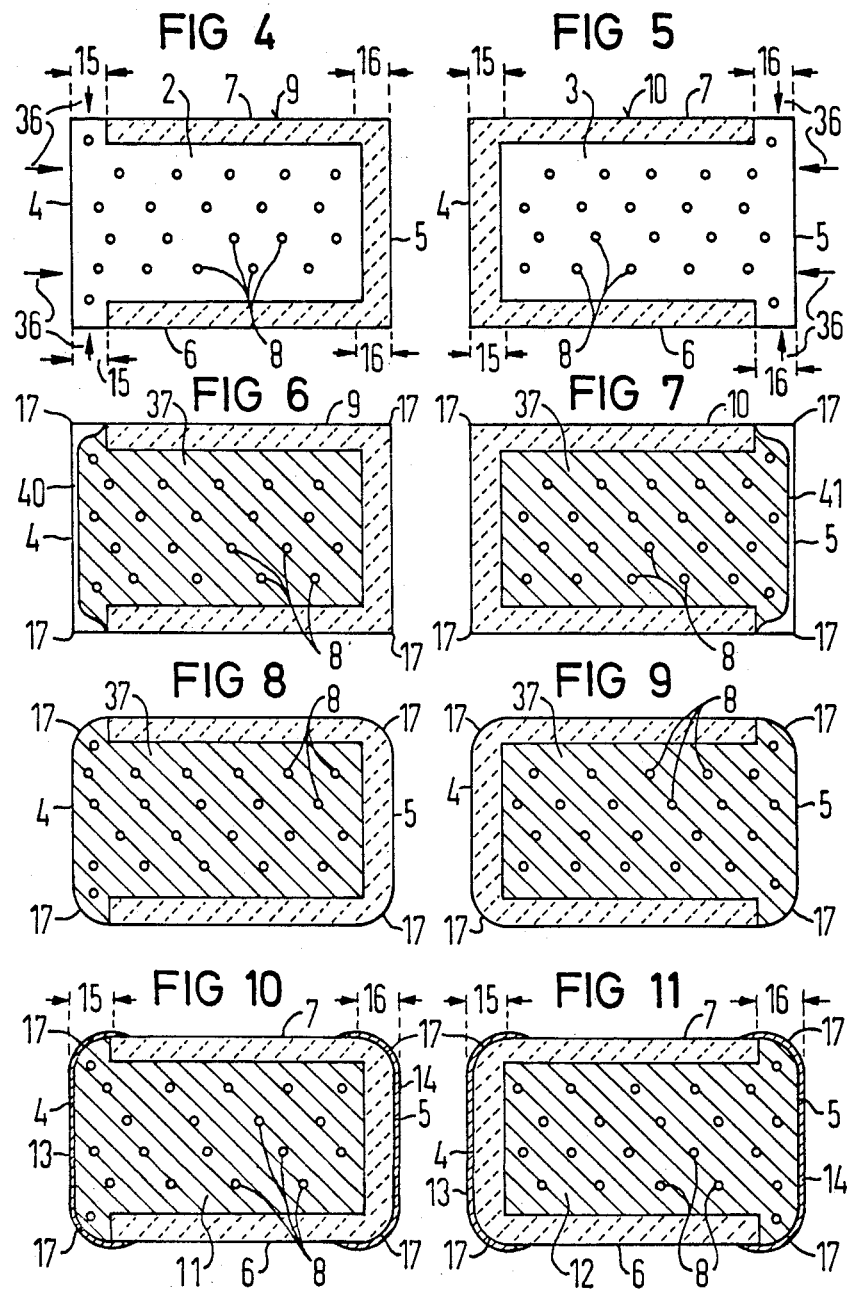

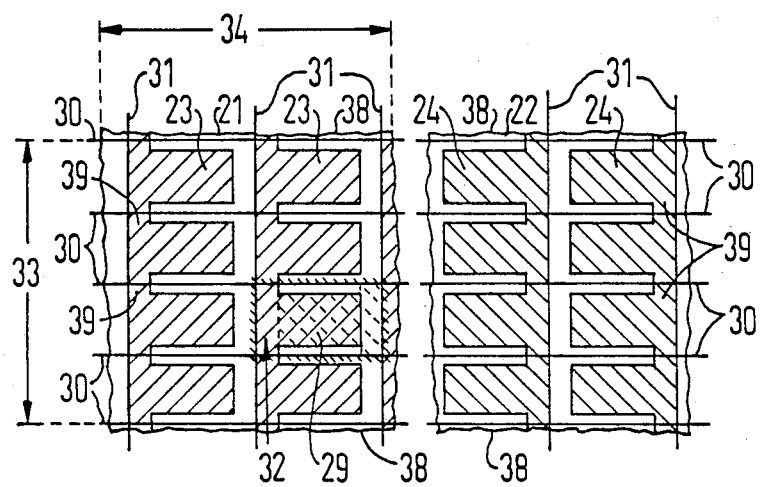
FIG 12
FIG 13
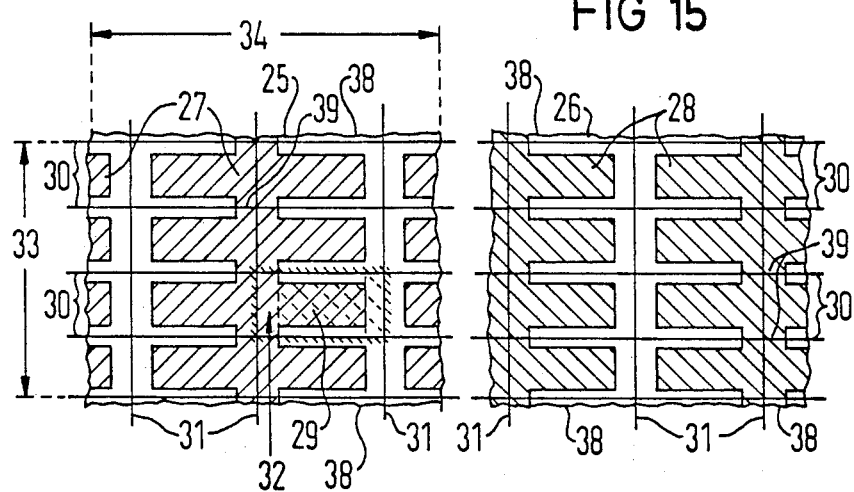
FIG 14
FIG 15

ELECTRICAL MULTILAYER COMPONENT COMPRISING A SINTERED, MONOLITHIC CERAMIC BODY AND METHOD FOR ITS MANUFACTURE

BACKGROUND OF THE INVENTION

1. Field of the Invention

The present invention is directed to an electrical multilayer component which may be a capacitor, a PTC. resistor or a varistor.

2. Description of the Prior Art

Electrical multilayer capacitors having a sintered, monolithic ceramic body of dielectric material of the type to which the present invention is directed has already been disclosed in patents in various embodiments. Of the extensive patent literature U.S. Pat. Nos. 3,679,950; 4,071,880; and 4,658,328 are believed to be the most pertinent.

U.S. Pat. No. 3,679,950 discloses a ceramic multilayer capacitor which includes cavities which alternate from layer to layer of the multilayer structure, but are only open toward the end faces which are in opposed relation but are not open toward the adjacent lateral surfaces which are at right angles to the end faces. This U.S. patent also discloses a method for the manufacture of an electrical multilayer capacitor wherein a suspension of particles is printed on to the ceramic body in limited region to produce cavities which are open only to one side. Since the finished stack of a plurality of layers prepared in this way is closed on practically all sides, it is necessary that the stack be separated into discrete members along parting lines that exist perpendicular relative to one another so that the escape and/or the decomposition of volatile constituents to be removed from the suspension for the formation of the cavities can occur in a subsequent sintering process.

In addition to other possibilities, a metal or alloy having a low melting point, for example, lead or an alloy composed of 50% Bi, 25% Pb, 12.5% Sn and 12.5 Cd are mentioned for the manufacture of the capacitor coatings inside the cavities of the monolithic ceramic body. While these alloys have melting temperatures which are considerably lower than the sintering temperature used for sintering the monolithic ceramic body, they do not wet the surface of the ceramic body in the cavities, or wet it only poorly.

With the multilayer capacitor disclosed in U.S. Pat. No. 3,679,950 the contact layers which are usually composed of silver are always applied to the end faces after a molten metal having a low melting point has been pressed in and after the cooling of the saturated ceramic body.

U.S. Pat. No. 4,071,880 discloses practically the same electrical multilayer capacitor comprising a sintered, monolithic ceramic body as that disclosed by U.S. Pat. No. 3,679,950. Beyond this, U.S. Pat. No. 4,071,880 also discloses the possibility of applying the contact layers to the end faces of the monolithic ceramic body before the introduction of metal, for which purpose these contact layers must be made porous. The effect is that molten metal can not flow out after removal from the melt because the metals employed do not wet the ceramic body or wet it only poorly.

The multilayer capacitor disclosed in U.S. Pat. No. 4,071,880 is composed of a plurality of ceramic layers and internal electrodes which lie on top of one another in alternating fashion and is also composed of outer, double layer electrodes which are connected to the inside electrodes in a predetermined fashion. For example, a comb-like electrode structure may be present.

In the manufacture of such a monolithic multilayer capacitor, untreated or unsintered ceramic laminae are first produced with the assistance of a stripping or squeege method using a stripper or scraper blade. These ceramic laminae have a thickness of 0.05 to 0.1 mm. A carbon containing paste is then applied to or printed on to the surfaces of the ceramic laminae, the paste being composed of a mixture of carbon particles and ceramic powder. This paste is applied in limited regions, such that the cavities in the finished ceramic body are alternately opened only toward the opposite end faces. A plurality of such printed ceramic laminae are arranged on top of one another alternately and are joined to one another for forming an integrated structure by applying pressure. Discrete bodies are produced from this integrated structure by cutting along lines that are located perpendicularly relative to one another, the discrete bodies being sintered at a temperature above 1,000° C. in order to sinter the ceramic laminae and in order to eliminate the carbon powder within the paste that has been printed on. As a result, porous intermediate layers comprising ceramic powder are produced in regions in which the inside electrodes are to be formed. Following this, the porous outer electrodes or contact layers are applied to the sintered discrete bodies.

In the case of the prior art as in the case of the present invention, the electrodes can be applied with methods that are disclosed in U.S. Pat. Nos. 3,683,849; 4,526,129; and 4,561,954; in British patent No. 2,106,714; in German patent No. 27 22 140 or in German published application No. 36 38 286.

For example, the outer electrodes may be obtained by firing a paste that is principally composed of nickel and is mixed with a glazing compound. A ceramic body formed in this way is then introduced into a pressure vessel and is dipped into molten lead that serves as the conducting metal for the capacitor coatings. The temperature of the melt is about 330° to 360° C. in its unpressurized condition. Subsequently, the pressure is elevated to about 10 bar so that molten lead penetrates into the cavities of the ceramic body under pressure, passing exclusively through the porous, outer electrodes. The ceramic body is then removed from the molten lead, cooled, and exposed to normal pressure so that the inner electrodes of lead are formed. Following this, additional layers that ar solderable are applied to the outer electrodes.

In order to manufacture the described multilayer capacitor, the outer electrodes applied to the monolithic ceramic body must be porous and must be manufactured such that the entry of molten lead is initially possible for the inside electrodes but lead is prevented from flowing out of the cavities when the ceramic body is removed from the molten lead. As recommended in U.S. Pat. No. 4,071,880 the metal to be introduced should not easily wet the ceramic body. In other words, the porous, outer electrodes form penetration barriers under certain conditions. The porous, outer electrodes are principally composed of nickel that does not react with lead. The adhesion to the end faces of the ceramic body depends on the amount of glazing compound contained within the paste, the adhesion being improved with an increasing amount of glazing compound. In this case, however, the number of pores in the outer electrode is diminished, so that the penetration of the lead is rendered difficult. The electrostatic capacitance therefore can not be controlled in a desired way, even when the ceramic module is exposed to a relatively high pressure within the melt.

In order to overcome the described problems, U.S. Pat. No. 4,658,328 corresponding to German published application No. 36 12 084 has proposed that the cavities in the interior of the ceramic body be designed such that they are open both to end faces which oppose one another as well as, to a slight degree, toward the adjoining lateral surfaces so that the molten metal during the injection process can penetrate not only through the porous contact layers but also penetrate through the lateral surfaces that are open to a slight extent and through parts of the cavities that are free of contact layers but can nevertheless not flow out from the cavities This U.S. patent also discloses a method corresponding to that previously described but with the limitation that the contact layers applied to the end faces have to be porous.

German Published Application Nos. 36 27 936 and 36 27 929 disclose multilayer capacitors comprising a sintered, monolithic ceramic body and methods for the manufacture thereof similar to those already described. In contrast with previous disclosures, however, these published applications propose that a metal that wets the surface parts inside the cavities of the ceramic body be used as an easily melting metal for the capacitor coatings.

According to these published German applications, pressing metals into the ceramic bodies continues to occur through the openings of the cavities that are directed toward only one side and which may be free of a contact layer or covered by a porous contact layer. In the former case, the contact layers are subsequently applied.

The use of a metal that wets the surface of the ceramic body has the advantage that the metal no longer flows out the cavities of the ceramic body when it is removed from the metal melt and that a good bonding of the capacitor coatings to the contact layers is guaranteed.

When the easily melting metal is pressed through porous contact layers into the cavities in the ceramic body, the cavities being opened only toward one side, the problems that have already been discussed appear, namely, the risk of blocking the pores in the porous layer and, thus, the risk of an inadequate filling of the cavities. These problems are not eliminated even when employing metals which wet the ceramic well. Problems also arise when applying contact layers following the impregnation with the metal melt and cooling of the filled ceramic bodies, in that the bonding of the capacitor coatings in the inside of the ceramic body through the contact layers at the end faces can be inadequate.

U.S. Pat. No. 4,584,629 corresponding to British patent No. 2 162 371 or German Published Application No. 35 09 593 contains a very detailed description of the manufacture of multilayer capacitors. With these capacitors, too, the contact layers are applied to the opposite end faces of the sintered ceramic bodies before the metal is put into the cavities. The technique set forth therein, as well as in the other patents, can likewise be employed for manufacturing the ceramic body and for pressing the metal melt into the cavities in the present invention.

Ceramic PTC resistors in layer form are disclosed, for example, in British Patent No. 932 558 and ceramic multilayer varistors are disclosed, for example, in U.S. Pat. No. 4,675,644 correspondig to EP-A-No. 0 189 087. In these disclosures, the metal coatings are already produced before the sintering of the ceramic bodies, using heat resistant precious metals such as platinum, palladium, silver or the like, as likewise disclosed in U.S. Pat. No. 3,740,624.

SUMMARY OF THE INVENTION

The present invention provides an electrical multilayer component and a method for the manufacture thereof which assures, first, a good bonding with a connection having a low electrical contact resistance between the interior of the ceramic body and the contact layers and a substantially complete filling of the cavities in the ceramic body. Second, it provides a significant simplification of the manufacturing method. Further, the multilayer components are suitable for surface mounting, are wettable by solder, have alloying resistance, have resistance to chemical and temperature influences, and a geometry adapted to that of circuit boards.

The electrical multilayer component of the present invention is characterized by the following features:

1. In the ceramic body, the edges between the end faces and the lateral surfaces and also the edges between the end faces and the ridges between the surfaces and the lateral surfaces are rounded by mechanical processing such that the metal coatings existing in the cavities extend up to the contacts.

2. The contact layers at the end faces are not porous and, on the lateral surfaces, cover at least the portions of the cavities which are open to the lateral surfaces.

Different alloys can be employed for the metal filler, for example, a lead-indium alloy having an indium content at least as great as 0.5 percent by weight, and preferably 2.5 to 20 percent by weight. A lead-silver-indium alloy containing at least 0.5 percent by weight indium and a total of up to 20 percent by weight silver and indium can also be used, along with copper-indium or silver-indium alloys.

The contact layers are preferably composed of nickel or alloys having a high proportion of nickel, or of silver or alloys thereof having a high proportion of silver.

In a preferred embodiment, the contact layers are multilayered and composed of an inner layer of aluminum or chromium, a second layer of nickel or nickel-vanadium, and an outer layer of silver thereover. When the aluminum layer is 0.5 um thick, the second layer may be composed of nickel-vanadium of a thickness of 1.5 um and an outer silver layer of 1 um.

To improve the long term behavior of the contact material so that it is capable of being stored for two years, as determined by a moistenability test for 16 hours at 155° C. a tin layer can also be applied over the silver layer.

The contact layers are preferably applied by printing such as through the use of a silk screen, dipping, electrodeposited or chemically deposited, or applied by cathode sputtering, by vapor deposition, or by metal spraying methods.

If necessary, it is advantageous that at least those regions of the lateral surfaces which are free of contact layers are covered with electrical insulating and moisture proof material such as a plastic material as disclosed in U.S. Pat. No. 4,658,328 or German Published Application No. 36 12 084.

In general, the method of the present invention involves forming ceramic particles into layers of from 0.3 to 0.1 mm thickness, applying a suspension layer having a thickness of 0.005 to 0.02 mm over the layers in the form of patterns, the suspension containing materials which volatilize upon subsequent sintering of the ceramic particle layers. A stack of the layers and the patterns is made up with the layers and patterns in overlapping relationship, whereupon the resulting stack is compressed and sintered at temperatures of at least 1,000° C. The sintered ceramic bodies are then dipped into a metal melt contained in a pressurized vessel. The metal containing stack is cooled while reducing the pressure to atmospheric pressure. In accordance with the present invention, the cooled stack is abraded in a grinding vessel with an aqueous suspension of abrasive particles to round off edges of the stack to the extent that the metal of the stack extends completely to the end faces of the stack, followed by applying non-porous contact elements to the end faces of the stack. Typically, the abrasive powder may be silicon carbide having a grain size of 50 um average grain diameter. About 50 to 200 g of the powder is combined with 1500 g of the ceramic body for mechanical treatment and are then circulated in a grinding vessel together with water in the ratio of 500 to 1,000 g water to 1700 g of the solids mixture. It is advantageous in the grinding step that the grinding vessel be composed of a material such as V2A steel and that the grinding be accomplished in a cylinder mill revolving at a rate of 60 to 100 revolutions per minute.

The present invention provides numerous advantages. As a result of the rounded edges, the surface of the filled ceramic body is eroded to such an extent that the metal remaining in the cavities is in good physical contact with the contact layers at the end faces and at the adjoining edges even with a metal that has poor wetting properties. It is particularly true when using metal fillers that have good wetting properties.

Another advantage is that the filling with metal is accomplished in shorter time. As a result of the unimpeded penetration, shorter immersion times and lower pressures are employed during immersion, with a lower stressing of the ceramic bodies thus resulting. Further, the application of the contact layers before the filling with the metal melt prevents the individual bodies from sticking together or even fusing together in every stage of the process. Also, since it has been shown that the employment of metals which wet the surfaces in the cavities of the ceramic layers of the ceramic body leads to edge regions which are free of metal at the end faces and at the adjoining lateral surfaces due to contraction of the metal, the scouring of the edges effects a reliable contact to the contact layers.

When manufacturing the ceramic bodies it is no longer necessary to produce limited spots of the suspension for the porous intermediate layer on the individual suspension layers. Instead, regions that extend over the entire width of the suspension layers and are composed of suspension material in the form of patterns connected by bridges can be applied for the porous intermediate layer. As a result, it is also possible to sinter not only the discrete part but even larger stacks which can be divided into individual ceramic bodies only after sintering because the decomposition and escape of the volatile constituents of the porous intermediate layer can nevertheless emerge from this larger stack. The free surface portions of the lateral surfaces or even the entire multilayer component can be provided with a covering envelope of known insulating material in order to encase the insulation or as a protection against moisture. Furthermore, the filling metal which may possibly be present at undesired locations is removed in a simple way during the mechanical treatment.

The invention is particularly directed to multilayer capacitors but can also be employed for PTC resistors or varistors.

The ceramic material used herein which has dielectric or semiconducting properties includes, for example, ferroelectric, dielectric material having a perovskite structure such as titanates of alkaline earths particularly of barium or mixed titanates as well as those in which barium is substituted by other alkaline earths or magnesium and those wherein the titanium is substituted, for example, by tin. The dielectric material having perovskite structure can be doped with additives such as, for example, antimony, bismuth or lanthanum or rare earth metals or also with copper, or iron so that higher values of dielectric constant or improved PTC properties result or that other electrical properties such as the temperature dependency or the loss factors can be varied in accordance with desired requirements.

BRIEF DESCRIPTION OF THE DRAWINGS

The invention will be set forth in greater detail with reference to an embodiment of the invention consisting of a multilayer capacitor shown in the attached figures.

FIG. 4 is a cross-sectional view taken substantially along the line IV—IV in FIG. 1;

FIG. 5 is a cross-sectional view taken along the line V—V of FIG. 1;

FIGS. 6 and 7 are cross-sectional views along the lines VI—VI and VII—VII of FIG. 1, after application of the metals;

FIG. 8 is a cross-sectional view taken along the line VIII—VIII in FIG. 2 before the application of the contact layers;

FIG. 9 is a cross-sectional view along the line IX—IX in FIG. 2 before the application of the contact layers;

FIG. 10 is a cross-sectional view along the line X—X in FIG. 2 after the application of the contact layers;

FIG. 11 is a cross-sectional view substantially along the line XI—XI in FIG. 2, after the application of the contact layers;

FIG. 12 shows a suspension layer comprising applied suspension patterns in a plan view;

FIG. 13 shows a further suspension layer comprising applied suspension patterns shown in a plan view;

FIG. 14 shows a suspension layer comprising differently applied suspension patterns in a plan view; and FIG. 15 shows a further suspension layer comprising differently applied suspension patterns in a plan view.

DESCRIPTION OF THE PREFERRED EMBODIMENTS

Figure 1:
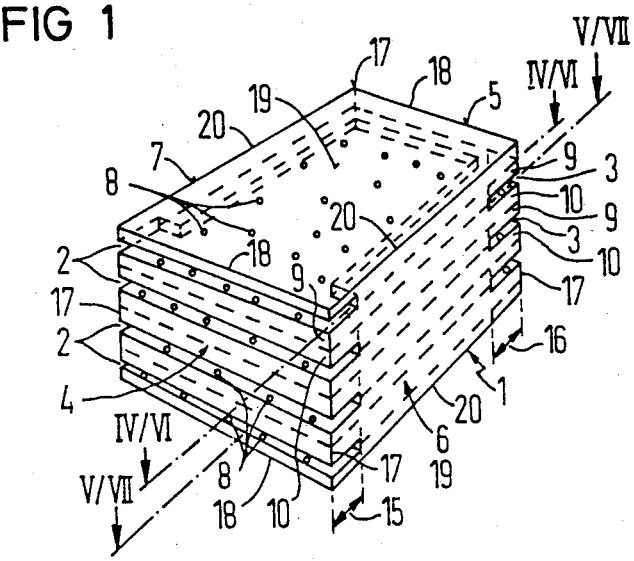
FIG. 1 is a view in perspective of a monolithic ceramic body before the cavities have been filled with metal and before the application of the contacts.

FIG. 1 shows a sintered monolithic ceramic body 1 which is traversed by cavities 2, 3. The cavities 2 are open toward end face 4 and the cavities 3 are open toward an end face 5 of the ceramic body 1. Both cavities, however, are also open toward opposed lateral surfaces 6 and 7 in limited regions 15 and 16. Ceramic particles 8 are distributed through the volumes of the cavities 2 and 3 and serve as supporting elements. The monolithic ceramic body 1 is sintered together from layers 9 and 10 which serve as a dielectric for the capacitor.

Edges 17 are situated between the end faces 4 and 5 and the lateral surfaces 6 and 7. Edges 18 are situated between end faces 4 and 5, and the surfaces 19. Edges 20 are situated between surfaces 19 and the lateral surfaces 6 and 7. After the filling and solidification of the metal in the metallic filler layers 11 and 12, the edges 17, 18 and 20 are eroded by mechanical processing and are thereby rounded.

FIG. 1 shows the ceramic body 1 in a condition following the sintering but before the filling of the cavities 2 and 3 with the low melting metals, before the mechanical processing thereof and before the application of the contact layers 13 and 14 to the end faces 4 and 5.

Figure 2:
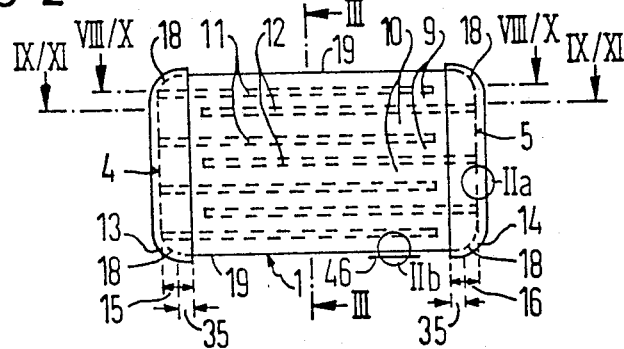
FIG. 2 is a plan view of the completed multilayer capacitor.

FIG. 2 shows a finished multilayer capacitor in plan view. The monolithic ceramic body 1 is sintered together from the ceramic layers 9 and 10 and the cavities 2 and 3 are filled with metal fillers 11 and 12. Alternately from layer to layer, these metal fillings 11 and 12 terminate at opposed end faces 4 and 5 and are electrically connected to one another there by the contact layers 13 and 14.

As shown in U.S. Pat. Nos. 3,679,950 and 4,071,880, the contact layers 13 and 14 can also cover only the end faces. These contact layers are either solderable themselves or include a further solderable layer to which power leads can be soldered.

To achieve a better electrical connection of the metal fillers 11 and 12 at the rounded edges 17, it is advantageous that the contact layers 13 and 14 be formed not only at the end faces 4 and 5 but also on the lateral surfaces 6 and 7, covering at least the regions 15 and 16. This structure is advantageous for what are referred to as chip components because they can be directly soldered on to a circuit board provided with printed interconnects. In such case, the contact layers 13 and 14 may extend to the surface 19 so that a seating surface having the width 35 results. This width is dimensioned such that it is adapted to the surfaces to which this chip capacitor is to be soldered.

Figure 2A:
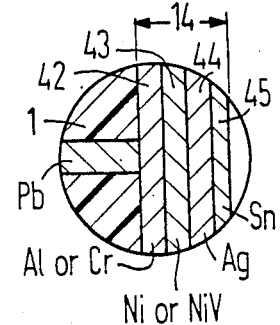
FIGS. 2a and 2b are enlarged views of the sections 11a and 11b of FIG. 2.
Figure 2B:
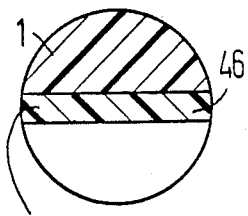

The rounded edges 18 between end faces 4 and 5 and the surfaces 19 may be seen in FIG. 2. FIG. 2a will be described later. In FIG. 2b the layer 46 of insulating and moisture proof material covers the lateral surfaces 6,7 which are not covered by the contact elements 3 and 4, if necessary.

Figure 3:
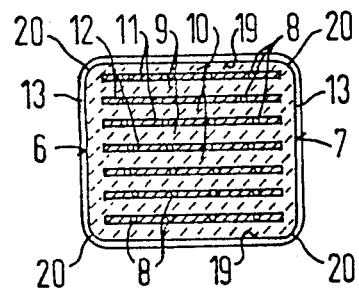
FIG. 3 is a cross-sectional view taken substantially along the line III—III of FIG. 2.

In FIG. 3, the ceramic layers 9 and 10, the metal fillers 11 and 12 and the contact layer 13 may be seen situated in and on the ceramic body 1 whose edges 20 between the surfaces 19 and the lateral surfaces 6 and 7 are shown rounded.

FIGS. 4 to 7 illustrate schematically the process of introducing the low melting metal melt into the multilayer article. The parts already set forth, namely, the cavities 2 and 3 and the ceramic particles 8 situated therein and distributed through the volume may be seen in FIGS. 4 and 5. The cavity 2 over the ceramic layer 9 is open toward the end face 4 and is likewise opened in a region 15 of the lateral surfaces 6 and 7. The cavity 3 over the ceramic layer 10 is open toward the end face 5 and is also open in a limited region 16 of the lateral surfaces 6 and 7.

A ceramic body provided with cavities in this form is fundamentally known from U.S. Pat. No. 4,658,328 which has previously been discussed. The ceramic body shown therein, however, is first provided with porous contact layers at the end faces, the porous contact layers extending on to the lateral surfaces and on to the surfaces of only such an extent that a part of the cavities open toward the lateral surfaces nevertheless continue to remain open and molten metal can then also be injected therein.

In contrast, the ceramic bodies provided with cavities 2 and 3 are first filled with a metal melt in the method of the present invention. The melt is pressed into the cavities 2 and 3 in accordance with the direction shown by the arrows 36.

FIGS. 6 and 7 schematically show that the solidified metal melt 36 in the cavities 2 and 3 open at the end faces 4 or 5 and in the regions 15 and 16 of the lateral surfaces 6 and 7 forms spaces free of metal due to the contraction during solidification. These spaces are identified at numeral 40 at the end faces 4 and at numeral 41 at the end faces 5.

The ceramic bodies 1 filled with metal are subsequently subjected to a mechanical surface treatment according to the present invention wherein the edges 17 and the edges 18 and 20 are rounded off.

The solidified metal melt 37 and the ceramic particles 8 distributed through the volume of the melt can be seen in FIGS. 8 and 9. It is also shown in these two figures that the edges 17 have been rounded off as a result of the mechanical surface treatment so that the cavities 40 and 41 have been practically eroded to such an extent that the solidified metal melt 37 extends up to the end faces 4 and 5.

Referring to FIGS. 10 and 11, non-porous contact layers 13 and 14 at the end faces 4 and 5 are shown extending around on to the lateral surfaces 6 and 7 in the regions 15 and 16, the layers being applied by known metallization methods.

The bonding, i.e., the electrical connection between the contact pairs 13 and 14 and the metal fillers 11 and 12 is particularly tight in the region of the rounded edges 17 because the surface has been particularly well pre-treated for the deposition of the contacting metal on the basis of the mechanical processing.

FIGS. 12 to 15 show a method for manufacturing the sintered, monolithic ceramic body 1 up to a certain stage in the process.

Suspension layers 21 and 22 or 25 and 26 are manufactured from a suspension for the ceramic layers 9 and 10. The manufacture of such suspension layers is well known in the art. Pre-sintered materials in powder form used to form the dielectric layers in the sintered condition contain an agent which volatilizes during the later heating process for sintering. The layers are provided with patterns 23 and 24 or 27 and 28 over their entire width 33.

The suspension patterns 23 and 24 are aligned such that the spots providing the later cavities, these being connected to one another by bridges 39, provide a row over the width 33. In comparison, the suspension patterns 27 and 28 are designed such that two such rows are directly adjacent to one another on every suspension layer 25 or 26.

The manufacture of a suspension for the patterns and the manner of application thereof to the suspension layers 23 and 24 or 25 and 26 is likewise known from the above mentioned patents, for example.

A plurality of suspension layers 21 and 22 or 25 and 26 prepared in this way are placed together such as to form a stack for the suspension patterns 23 and 24 or 27 and 28 overlapping in a relatively large region 29 as shown with shaded boundaries in FIGS. 12 and 14. The overlapped region 29 lies practically in the middle of the individual body 32 (bounded with shading) that arises when the suspension layers provided with the patterns are stacked on top of one another and when, following a pressing process, they are divided along cutting lines 30 in a longitudinal direction and along cutting lines 31 in the transverse direction before or after sintering.

The shape of the suspension patterns not only allows the individual bodies 32 to be sintered in their raw condition, it also allows a stack formed of a plurality of suspension layers to be sintered after the application of pressure and heat because, due to the bridges 39, the suspension patterns 23, 24, 27 and 28 extend up to the outside edges 38 of the suspension layers 21, 22, 25 and 26 in the region of the bridges 39 so that the constituents of the suspension of the patterns to be volatilized by heating can escape.

It will be seen from FIGS. 12 to 15 that the length 34 and the width 33 of the suspension layers each amounts to a multiple of the width and length of the later formed ceramic body represented by an individual body 32.

EXAMPLE

At those locations where the inner electrodes are in the finished component such as in the multilayer capacitor, a plurality of suspension layers of ceramic films are printed with a lamp black paste composed of solvent, lamp black, resin and up to 30 percent by weight ceramic powder. The electrode shape is selected such that the inside electrode in the finished component extends toward the outside not only at the end faces but also in the regions of the lateral surfaces adjacent thereto. The ceramic foils are stacked on top of one another such that the printed surfaces in the unsintered ceramic bodies lead to one of the end faces alternatively. The stacks are pressed and then divided into individual parts. These parts are then heated to about 400° C. in a protective gas atmosphere wherein the solvents of the lamp black paste evaporate, the resin is decomposed and is likewise evaporated. In a further step, the individual parts are heated to about 1100° to 1300° C. in air, dependent on the type of ceramic employed, so that the carbon of the lamp black burns and then the residual components of the decomposed resin burn and the ceramic is sintered together. The parts manufactured in this way are composed of layers of dense dielectric ceramic and cavities containing supporting elements that are open in alternating fashion to one end face and to the other face and to limited regions of the lateral surfaces of the ceramic body.

The parts manufactured in this way are introduced into an autoclave with molten metal such as lead or lead alloy which wets the ceramic and are evacuated to a pressure less than 1 mbar. The parts are then completely dipped into the metal melt. The melt is forced into the cavities with a pressure of 10 to 20 bar preferably under a nitrogen atmosphere so that the surface of the molten metal does not excessively oxidize. After 20 to 120 seconds, the parts are lifted out of the metal bath, freed of excess metal by shaking, and cooled below the melting point of the metal whereupon the pressure in the autoclave is relieved and the parts are removed.

The ceramic members that now contain metal coatings as inside electrodes are subsequently mixed with silicon carbide powder and are filled into a V2A can together with water. The can that contains the ceramic bodies, silicon carbide powder and water is then put on a cylinder mill or similar apparatus for about 3 hours at 60 to 1 revolutions per minute so that the ceramic bodies are scrubbed by the silicon carbide powder. During this treatment, the surfaces are cleaned of adhering lead contaminations and the edges and corners are eroded, i.e., rounded off, so that after the scrubbing the inside electrodes that always retract somewhat from the end faces and lateral surfaces due to contraction when removed from the metal melt are made substantially flush to the end faces of the monolithic ceramic body. After the scrubbing, the parts are separated from the water and from the SiC powder with a sieve and are subsequently dried.

In the next step, contact layers are sputtered to the end faces of the ceramic body to form outside electrodes, so that the parts of the inside electrodes which are situated at the regions of the lateral surfaces adjoining the end faces are also covered by the contact layers.

The contact layers are preferably constructed of three layers having the following properties: (see FIG. 2a).

The first layer 42 is preferably formed of chromium or aluminum which produces a good adhesion layer to the ceramic and guarantees a low contact resistance in the finished capacitor.

The second layer 43 is preferably formed of nickel or of nickel-vanadium and represents a barrier layer for soldering.

A silver layer is applied as the third layer 44, guaranteeing a good solderability of the finished component. These three layers are applied according to the methods known in the art, preferably by sputtering.

A preferred embodiment of the contact layers consist of an aluminum layer of 0.5 um thickness, a nickel-vanadium layer of 1.5 um thickness, and a silver layer of 1 um thickness. Although this contact layer meets all demands for solderability and electrical contacting, it is not capable of unlimited storage for other demands. When storage of at least 2 years is required, then it is recommended that the contact layer be strengthened with an additional tin dip 45 over the silver layer. Multilayer ceramic capacitors manufactured in this way meet all demands of SMD parts.

It will be evident that various modifications can be made to the described embodiments without departing from the scope of the present invention.

The term "V2A" steel used in the description and claims is not a tradename but the well known name of a known steel of high hardness and high resistivity against corrosion. This steel consists e.g. of iron (Fe) together with 8% chromium (Cr), 8% nickel (Ni) and equal or less than 0.1% carbon (C).

We claim as our invention:

1. In an electrical multilayer component including a sintered, monolithic ceramic body having cavities extending in alternating fashion from opposed end faces and extending partially into opposed lateral surfaces at right angles to said opposed end faces, said body also having an upper surface and a lower surface parallel thereto, both mutually perpendicular to said opposed end faces and said opposed lateral surfaces, ceramic particles disposed in said cavities to serve as support elements between adjoining layers of said ceramic body, metal layers completely filling said cavities and composed of a metal whose melting temperature is substantially lower than the sintering temperature of said ceramic body, and contact elements covering said end faces and extending partially about said lateral surfaces, said contact elements electrically connecting together said metal layers, the improvement which comprises:

the edges between said end faces and their adjoining lateral surfaces as well as the edges between the end faces and said upper surface and said lower surface, as well as the edges between said upper and lower surfaces and the adjoining lateral surfaces being rounded off such that said metal layers extend out to said contact elements, and said contact elements being non-porous and covering those portions of said lateral surfaces which are open to the surfaces and are filled with metal layers.

2. An electrical multilayer component according to claim 1 wherein said metal has the property of readily wetting the surfaces of said ceramic layers in its molten condition.

3. An electrical multilayer component according to claim 1 wherein said metal is a lead-indium alloy having an indium content of at least 0.5 percent by weight.

4. An electrical multilayer component according to claim 1 wherein said metal is a lead-silver-indium alloy containing at least 0.5 percent by weight indium and a total of up to 20 percent by weight of silver and indium.

5. An electrical multilayer component according to claim 1 wherein said metal is a copper-indium or a silver-indium alloy.

6. An electrical multilayer component according to claim 1 wherein said metal consists predominately of nickel.

7. An electrical multilayer component according to claim 1 wherein said metal consists predominately of silver.

8. An electrical multilayer component according to claim 1 wherein said contact elements are multilayer, the inner layer consisting of aluminum or chromium, a middle layer of nickel or nickel-vanadium alloy, and an outer layer of silver.

9. An electrical multilayer component according to claim 8 which includes a layer of tin over said outer layer of silver.

10. An electrical multilayer component according to claim 8 wherein said aluminum layer is about 0.5 um thick, said middle layer is composed of nickel-vanadium and is about 1.5 um thick, and said silver layer is about 1 um thick.

11. An electrical multilayer component according to claim 1 wherein the portions of said lateral surfaces which are not covered by said contact elements are covered with electrically insulating, moisture proof material.

12. A method for the manufacture of an electrical multilayer component which comprises:

forming said ceramic particles into layers of from 0.03 to 0.1 mm thickness, applying a suspension having a thickness of about 0.005 to 0.02 mm over said layers in the form of patterns, said suspension containing materials which volatilize upon sintering of said ceramic particle layers, forming a stack of said layers and said patterns in overlapping relationship, compressing the resulting stack, sintering the compressed stack at a temperature of at least 1000° C., dipping the sintered ceramic bodies into a metal melt contained in a pressurized vessel, cooling the metal containing stack while reducing the pressure to atmospheric pressure, abrading the cooled stack in a grinding vessel with an aqueous suspension of abrasive particles to round off edges of said stack to the extent that the metal of said stack extends completely to the end faces of said stack, and applying non-porous contact electrodes to the end faces of said stack.

13. A metal according to claim 12 wherein said patterns are connected to each other over the full width of said layers by bridges.

14. A method according to claim 12 wherein said grinding vessel is composed of V2A steel and which is rotated at a speed of from 60 to 100 rpm.

* * * * *